(12) United States Patent
Dickinson

(10) Patent No.: US 7,383,953 B2
(45) Date of Patent: Jun. 10, 2008

(54) SHIPPING CONTAINER AND METHOD FOR USING THE SAME

(75) Inventor: Kent H. Dickinson, Covington, GA (US)

(73) Assignee: Eggs Overnight, Inc., Stone Mountain, GA (US)

( * ) Notice: Subject to any disclaimer, the term of this patent is extended or adjusted under 35 U.S.C. 154(b) by 483 days.

(21) Appl. No.: 11/161,513

(22) Filed: Aug. 6, 2005

(65) Prior Publication Data

US 2006/0021897 A1 Feb. 2, 2006

Related U.S. Application Data

(63) Continuation-in-part of application No. 10/170,013, filed on Jun. 10, 2002, now Pat. No. 7,106,202, which is a continuation-in-part of application No. 09/956,478, filed on Sep. 18, 2001, now Pat. No. 6,737,974.

(51) Int. Cl.
*B65D 81/02* (2006.01)
(52) U.S. Cl. .................. 206/522; 206/585; 206/591; 53/472; 53/474
(58) Field of Classification Search .............. 206/521, 206/522, 523, 585, 591, 592, 593, 594, 778; 383/3; 53/449, 469, 472, 474
See application file for complete search history.

(56) References Cited

U.S. PATENT DOCUMENTS

| 3,412,521 | A | * | 11/1968 | Bauman ..................... 53/474 |
| 3,587,794 | A | * | 6/1971 | Mattel ..................... 190/13 R |
| 3,750,167 | A | | 7/1973 | Gehman et al. |
| 4,044,867 | A | | 8/1977 | Fisher |
| 4,107,861 | A | | 8/1978 | Johnson |
| 4,136,141 | A | * | 1/1979 | Bauer et al. ............... 264/45.2 |
| 4,136,788 | A | | 1/1979 | Robbins |
| 4,465,188 | A | | 8/1984 | Soroka et al. |
| 4,494,592 | A | | 1/1985 | Bonner |
| 4,551,379 | A | * | 11/1985 | Kerr ........................... 428/200 |
| 4,569,082 | A | | 2/1986 | Ainsworth et al. |
| 4,640,080 | A | * | 2/1987 | Wright ........................ 53/449 |
| 4,793,123 | A | * | 12/1988 | Pharo .......................... 53/449 |
| 4,805,776 | A | * | 2/1989 | Namgyal et al. ........... 206/523 |
| 4,858,755 | A | | 8/1989 | Kuivanen |
| 4,905,835 | A | * | 3/1990 | Pivert et al. ................ 206/522 |
| 5,038,283 | A | | 8/1991 | Caveney |
| 5,040,678 | A | * | 8/1991 | Lenmark et al. ............ 206/443 |
| 5,059,033 | A | | 10/1991 | Branson |
| 5,128,549 | A | | 7/1992 | Kaye |
| 5,217,131 | A | | 6/1993 | Andrews |
| 5,323,922 | A | | 6/1994 | Lapoint, Jr. et al. |
| 5,417,790 | A | | 5/1995 | Petrou |
| 5,441,170 | A | * | 8/1995 | Bane, III ................ 229/103.11 |
| 5,497,140 | A | | 3/1996 | Tuttle |

(Continued)

*Primary Examiner*—David T. Fidei
(74) *Attorney, Agent, or Firm*—Michael R. Henson; John W. Carpenter

(57) ABSTRACT

Provided is a shipping container having a flexible outer casing, a shell insert that is removeably received within the casing's interior and a tillable insert removeably disposed within an interior of the shell for receiving a shipping parcel. The fillable insert structure may be filled with a medium, such as air, to provide a cushioned environment for the parcel, and the shell insert may include a shelf panel which supports an accessory compartment for receiving selected items to accompany the parcel.

30 Claims, 3 Drawing Sheets

U.S. PATENT DOCUMENTS

| | | |
|---|---|---|
| 5,547,075 A | 8/1996 | Hoogerwoord |
| 5,557,096 A | 9/1996 | Watanabe et al. |
| 5,621,647 A | 4/1997 | Kraemer et al. |
| 5,628,858 A | 5/1997 | Petrou |
| 5,681,115 A | 10/1997 | Diederich et al. |
| 5,765,688 A * | 6/1998 | Bertram et al. ............. 206/523 |
| 5,769,232 A * | 6/1998 | Cash et al. ................. 206/522 |
| 5,844,485 A | 12/1998 | Ryan, Jr. |
| 5,845,806 A | 12/1998 | Parchman |
| 5,880,675 A | 3/1999 | Trautner |
| 5,957,583 A | 9/1999 | DeClements, Jr. et al. |
| 6,139,188 A | 10/2000 | Marzano |
| 6,161,959 A | 12/2000 | Abraham |
| 6,176,613 B1 | 1/2001 | Chen |
| 6,177,860 B1 | 1/2001 | Cromer et al. |
| 6,204,764 B1 | 3/2001 | Maloney |
| 6,224,258 B1 | 5/2001 | Dodson |
| 6,259,367 B1 | 7/2001 | Klein |
| 6,281,795 B1 | 8/2001 | Smith et al. |
| 6,297,727 B1 | 10/2001 | Nelson, Jr. |
| 6,334,537 B1 | 1/2002 | Tepper |
| 6,398,109 B1 | 6/2002 | Ohki |

* cited by examiner

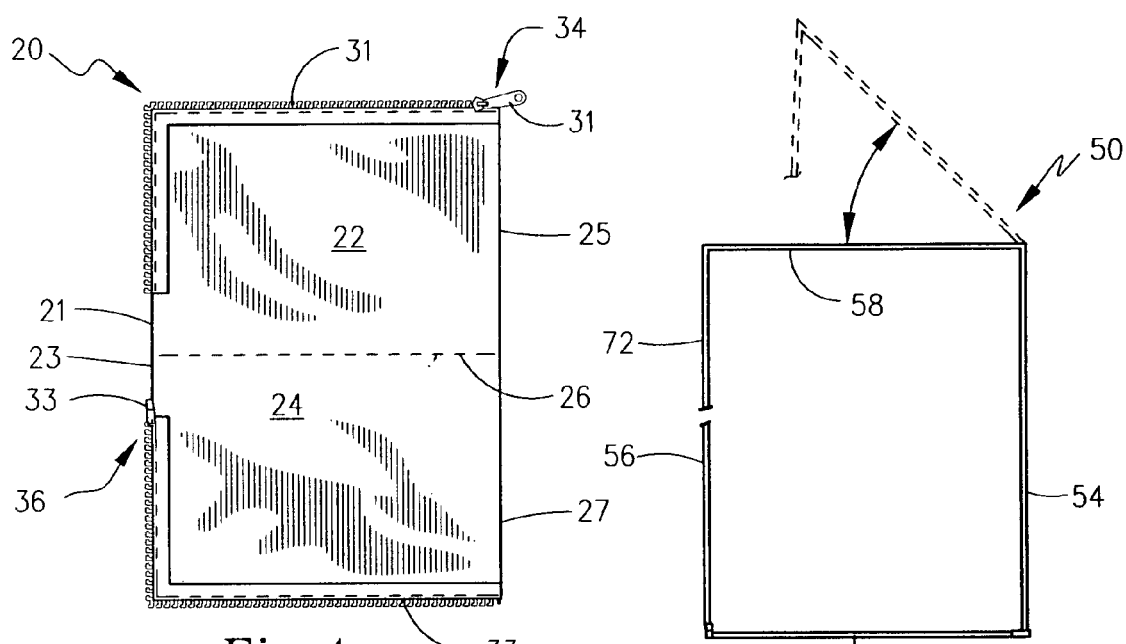
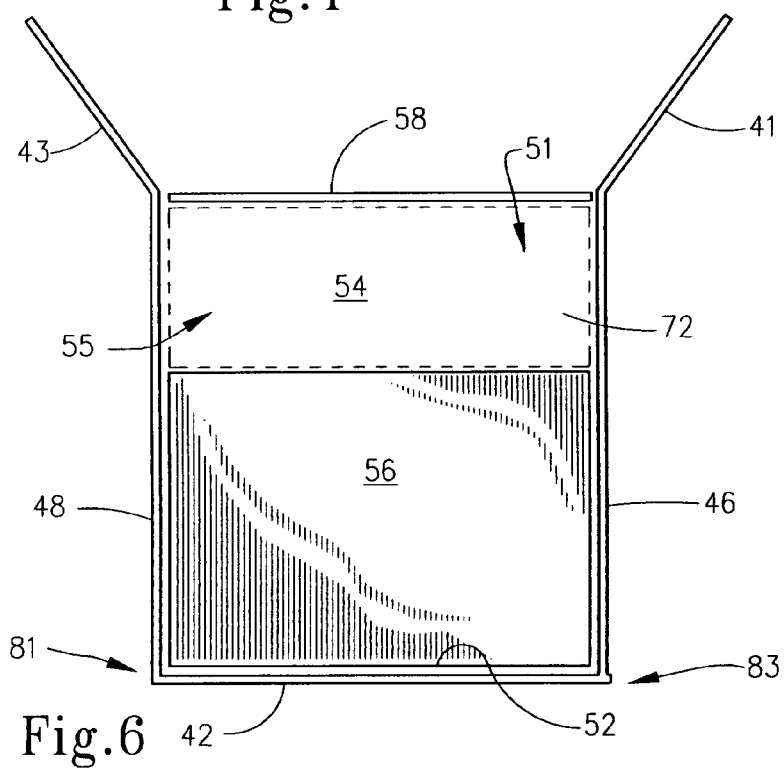
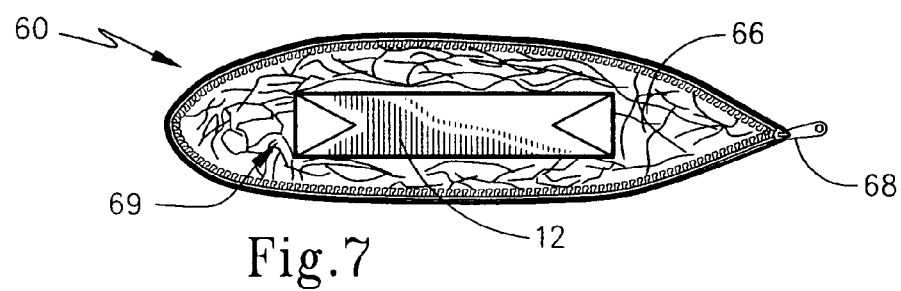

SHIPPING CONTAINER AND METHOD FOR USING THE SAME

BACKGROUND

The present invention is broadly directed to containers useful for transporting parcels between senders and recipients and method of using the same.

A fundamental need of commerce based societies is the transportation of goods from one location to another. The development of various postal systems, first on the national and then on an international basis, established an organized system wherein a carrier, for a price, would convey a parcel from a shipper to a recipient. The service provided by such carriers resulted in increasing demand and expansion of their served customer base. In addition to the governmentally sponsored postal services, private carriers have been organized to transport a wide variety of parcels for paying customers. Such companies include those known as United Parcel Service, Federal Express, DHL, Airborne and Emory, to name a few. The proliferation of such companies demonstrates the increasing need for their services.

In addition to the ordinary demands on the parcel carrier industry, the expansion of internet commerce already has and is expected to continue to place increasing demands on the need to ship small parcels from a merchant to a customer. The role of the parcel carrier is becoming increasingly integral to the success or failure of consumers' on-line experience and business in general. Shippers know the importance of having a dependable carrier who ultimately provides dependable service to the end-use customer.

The shipping trend in recent times has been toward smaller parcels, some of which are breakable but the majority of which are considered non-fragile or non-breakable. Indeed, as much as 65% to 70% of the entire parcel market in the United States may be classified as non-fragile, meaning that the actual products being shipped are resistant to damage if handled with any degree of care. However, traditional shipping techniques as far as packaging the parcels are not varied greatly between fragile and non-fragile items with the sometimes exception of the degree of cushioning in the material used for more fragile items.

For the past 40-50 years, shippers have been conditioned to excessively package parcel shipments because there have been few alternatives. Such excessive packaging leads to increased packing costs. This packaging cost results from two factors. First, the cost of packaging materials is not trivial. Typically, parcels are packed inside a one-time use only container, such as a paperboard carton, with the interior of the container filled with cushioning materials, such as styrofoam "peanuts", shredded paper or other paper based filler, to name a few. Second, there is a substantial time investment in packaging that results from the need to carefully pack and seal the paperboard carton and prepare the shipping documents for the same.

In addition to the problem of cost, packing waste is one of the leading contributors to landfill waste today and is a frustration for both the shipper and the recipient. This results from the need to inventory and dispose of these non-reusable materials. As internet commerce and mobile inventory management processes continue to grow, waste from shipped parcels can only be expected to worsen. This is especially true since a vast majority of parcels are excessively over-packaged with the actual product accounting for only about 25% of the available space inside each paperboard box. This is despite the fact that a majority of products could have been shipped without any packaging materials.

Such wasted space also reduces the volume shipping capacity of carriers, be it air transport or land based transport, such as trucks. The shipping of the packaging waste exhibits both direct costs as well as indirect costs in increased fuel consumption, wear and tear on airports, highways, etc. as well as environmental impact. By reducing the amount of waste materials, such indirect costs could be reduced.

While carriers profess to be interested in understanding the hardships on shippers, the only response to these hardships seems to have been in logistics planning. Little effort has been made to avoid unnecessary effort because the carriers would be required to change the service they offer. Further, the presence of several dominant players in the carrier industry have virtually dictated the packaging techniques that have been used for the last few decades, with these rules being those that have resulted in the costs discussed above.

Therefore, while current handling methods were acceptable in the past, there has been an increasing need felt for many years to develop better parcel handling techniques. The environmental and financial factors have been suggesting for many years the need for better solutions to providing carrier services. Indeed, even political factors are changing with governmental agencies listing the activities of box packaging and taping as an activity subject for repetitive motion injury. Accordingly, there is an ever increasing need for solutions to reduce or eliminate the liabilities of current parcel packaging and carriage. The present invention is directed to meeting these needs.

SUMMARY

One aspect of the exemplary embodiment disclosed herein is to provide a new and useful container for shipping parcels between locations.

Another aspect of the exemplary embodiment disclosed herein is invention to provide a reusable shipping container.

A further aspect of the exemplary embodiment disclosed herein is to provide a simple, reusable container that reduces the time necessary to package parcels.

Yet a further aspect of the exemplary embodiment disclosed herein another is to provide a new and useful method for packaging and shipping parcels from shippers to recipients that incorporates the containers noted above.

According to the exemplary embodiment, shipping containers are provided for that are adapted to receive a parcel for shipment to an intended recipient. The containers generally include a flexible outer casing, a protective insert structure, and a fillable insert.

The flexible outer casing has a casing interior and a casing mouth communicating therewith. The casing is general rectangular in configuration having a front casing panel joined to a back casing panel. Each casing panel has a respective bottom edge, top edge, sides edges. A first and second casing closure may be therewith, which are movable between an open position such that the parcel may be inserted into and removed from the casing interior and a closed position to retain the parcel in the casing interior as a received parcel.

The outer casing may also be provided with a second closure that is also movable between an open and closed position and located proximately to the one of the side edges of the casing panels. The first and second closure may specifically be zippers provided with pull tabs. If desired, a locking member can be provided that is adapted to retain both the first and second closures in their respective closed positions.

The protective insert structure is adapted to be removably disposed in the casing interior and may or may not be formed by an assembly of components. In one construction, the protective insert is a shell insert having fist and second shell body panels and first and second shell sidewall panels extending therebetween. The second shell sidewall panel is configured so as to form an opening in communication with the shell interior.

The shell insert may further include a shelf panel that is joined to the first shell sidewall that is sized and adapted to span the shell interior. The first and second shell sidewalls, and the shelf panel may be an integral one-piece construction of corrugated material. The shell insert structure may also include a shell closure flap that is hingedly joined to one of the shell body panels.

In another construction, the protective insert assembly includes a shell insert that includes a bottom shell wall and first and second shell panels supported by said bottom shell wall and extending upwardly therefrom in spaced relation to one another. The assembly also includes a sidewall structure that is removably disposed between the shell panels and, together with the shell panels, defines a protected interior. The sidewall structure includes an end panel adapted to confront the bottom wall of the shell wall, first and second sidewall panels and a shelf panel, which may be an integral one-piece construction of corrugated material. Here, the first sidewall panel has a first length and the second sidewall panel has a second length that is less than the first length so that a gap is formed between the second sidewall panel and the shelf panel, the gap being in communication with the protected interior. If desired, the sidewall structure can be further lined with a resilient protective lining, such as foam.

Notwithstanding the construction of either protective insert, the shelf panel may be movable between a first orientation and a second orientation. In the first orientation, the shelf panel spans the mouth interior parallel to the end panel of the sidewall structure. When in the second orientation, the shelf panel is moved relative to the sidewall to which it is attached so as to be oriented at an angle to the end wall of the sidewall structure.

A fillable insert is adapted to be removably disposed in the shell interior or protected interior having an insert interior for receivein the parcel and an insert mouth communication therewith. The fillable insert structure is adapted to receive a selected quantity of a filling medium to provide a cushioned environment for the parcel when disposed therein. The filling medium may be communicated thereto when the fillable insert is disposed in the shell interior through the opening formed by the sidewall panel and particularly the gap described above. The fillable insert may specifically be an inflatable bladder that can be inflated by means of an inflation valve. The bladder is preferably disposed in the shell interior so that access to the valve is permitted through the opening or gap.

The shipping container may further be provided with an accessory compartment that is adapted to be supported by the shelf panel. The accessory panel is sized and adapted to receive selected items to accompany the parcel for shipment. If provided, the closure flaps associated with the shell panels can then be closed over the accessory compartment so as to extend in parallel spaced relation to the shelf panel so that the accessory comportment is located between the shelf panel and the closure panels in a close-fitted relationship.

A method of packaging a parcel to be shipped is also contemplated. According to this method, an outer casing is provided that has a casing interior. A protective shell is disposed in the casing interior, which has an opening associated therewith. A fillable insert structure is inserted into the interior of the protective shell in which a parcel to be shipped is located. A selected quantity of a filling medium is then delivered to the fillable insert via the opening associated with the protective shell, after which the casing is closed about the protective shell. The method may further include the step of disposing the protective shell in the casing interior so that the opening is accessible prior to closing the casing thereabout. Further, the method may include the step of blocking the opening after delivering the selected quantify of filling medium.

BRIEF DESCRIPTION OF THE DRAWINGS

FIG. 4 is a top plan view of the outer casing in an unfolded condition;

FIG. 5 is a side view in elevation of the sidewall structure;

FIG. 6 is a side view in elevation of the assembled protective insert structure showing the sidewall structure located between the panels of the shell insert; and FIG. 7 is a front view in elevation of the bladder with the parcel located therein.

DETAILED DESCRIPTION OF THE
EXEMPLARY EMBODIMENTS

The embodiment disclosed herein broadly concerns a container provided for receiving a parcel for shipment to an intended recipient. One aspect of the container disclosed herein is that it employs one or more protective components so that it can be used for shipping non-breakable, non-fragile parcels, but is particular apt for shipping fragile parcels. Moreover, the present invention includes a shipping method that incorporates the use of the shipping containers described herein. Accordingly, the present invention provides an extension to the teachings of my co-pending U.S. patent application Ser. No. 10/170,013 filed Jun. 10, 2002, the disclosure of which is incorporated herein by reference.

Figure 1:
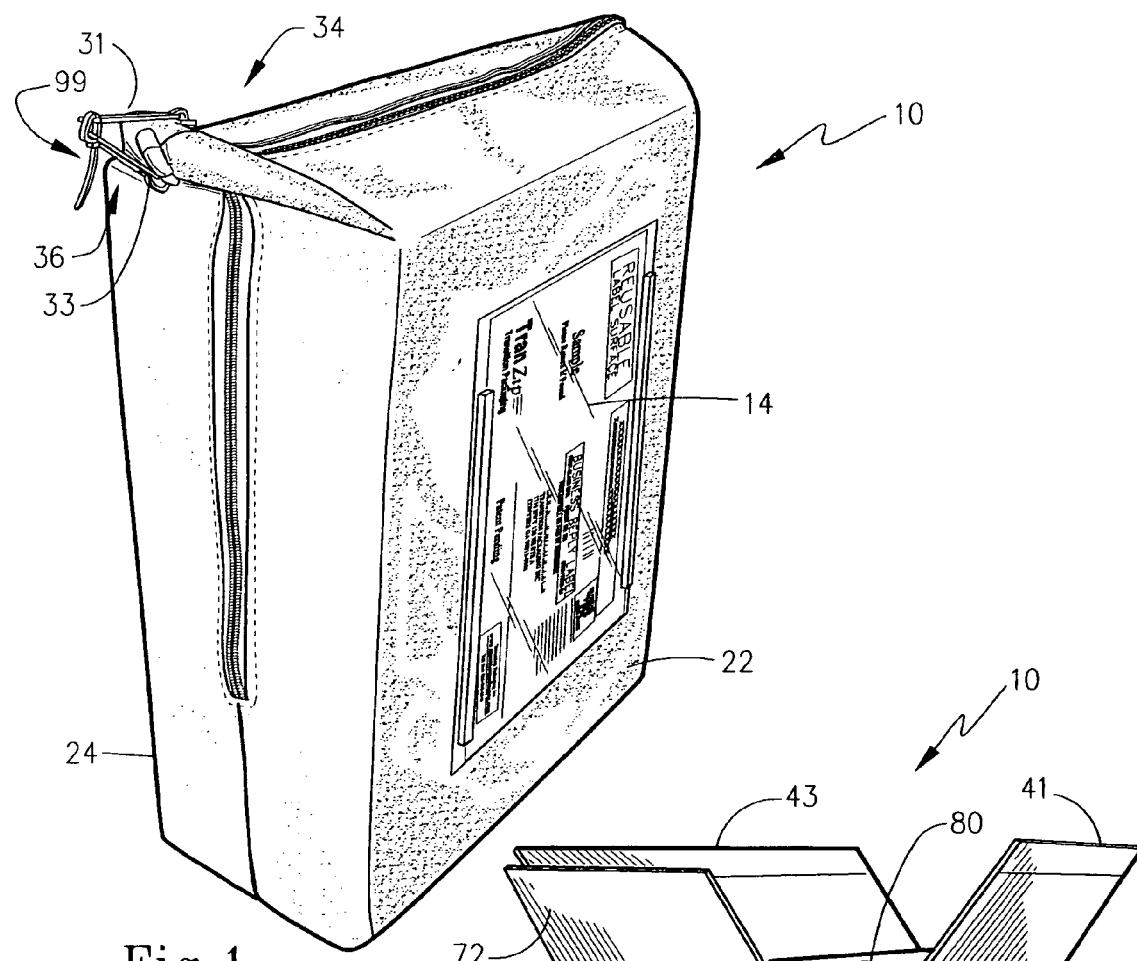
FIG. 1 is a perspective view of a shipping container according to the exemplary embodiment of the present invention.

With initial reference to FIG. 1, shipping container 10 is shown closed, locked and ready for shipment to the intended recipient. The various components of shipping container 10 are best described with reference to FIGS. 2 and 3 and, as shown, may generally include outer casing 20, protective insert assembly 40, and fillable insert 60, and accessory compartment 80.

Taking each of these components in turn, then, outer casing 20 is generally rectangular in shape and may be formed from one piece of flexible material folded over itself so as to have both a front casing panel 22 and a back casing panel 24. As shown in FIG. 4, outer casing 20 is a single piece of material that is folded over itself at midline 26. A portion of front panel 22 can then be stitched or otherwise joined to a portion of back panel 24 about their respective perimeter edges thereby to form an interior for receiving the various components of the shipping container and the parcel to be packed.

Particularly, as perhaps best shown in FIG. 4, a portion of front panel edge 21 can be stitched, for example to an equal portion of back panel edge 23 while front panel edge 25 is stitched to back panel edge 27. When front panel 22 and back panel 24 are so joined, the unjoined perimeter edges thereof define a mouth 30, which communicates with the casing interior 32, shown in FIG. 32.

Outer casing 20 may be formed of any suitable material, but it should be formed out of a sufficiently durable material so that shipping container 10 may be reused many times. For example, casing 20 may be formed of a heavy gauged cotton cloth or canvas material, but other suitable materials can be substituted as would be within the ability of the ordinarily skilled artisan. Accordingly, differing fabrics each offering a high degree of wearability, such as a 2-ply, 3-ply or foam-backed fabric, maybe employed. More particularly, the fabric can be a wearable poly-blend cloth that will facilitate reuse while also allowing for cleaning in an industrial washing machine, if desired. Even still, a heavy grade denier, such as 750, 1000 or even a "ballistic-nylon", can be employed. Although more costly, such a denier fabric material will provide for a greater number of uses. Accordingly, the fabric of choice will depend on the intended use but can be any appropriate material without restriction.

With continued reference to FIGS. 1-4, casing mouth 30 is associated with first and second closures, shown here in form zippers 34 and 36, having respective pull-tabs 31 and 33. Use of alternative closures are also contemplated that would be appropriate for closing the casing mouth to securely and safely retain the packaged parcel therein, for example, a tamper-resistant seal akin those typically found on bags which are used to ship pharmaceuticals, as discussed in my co-pending application Ser. No. 10/170,013 mentioned above.

As shown, zipper 34 is located proximate to respective top edges 31, 33 of casing panels 22, 24 while zipper 36 is located proximate to the unjoined portions of edges 21, 32 respectively of the casing panels. Both zippers 34 and 36 are movable between open and closed positions. Taking each zipper in turn, zipper 34 is movable between a first open position, shown for example in FIG. 3, and a first closed position shown in FIG. 1. Similarly, zipper 36 is movable between a second open position, shown for example in FIG. 3, and a second closed position shown in FIG. 1.

Outer casing 20 also supports a shipping label 14, the construction of which may be that of the label described in my co-pending U.S. patent application Ser. No. 11/160,529, filed Jun. 28, 2005, the disclosure of which is incorporated herein by reference. Alternative shipping label constructions are also describe in my co-pending U.S. patent application Ser. No. 10/298,145, filed Nov. 15, 2002, the disclosure of which is incorporative herein by reference.

Protective insert assembly 40 is adapted to be removably disposed in the casing interior 32 and is formed by the assembly of two parts—a shell insert 42 and a sidewall structure 50, together forming a protective interior for the bladder. Shell insert 42 includes bottom shell wall 44, and first and second spaced apart shell panels 46, 48 supported thereby. Shell insert 42 is also provided with first and second closure flaps 41 and 43, which are hingedly joined, respectively to shell panels 46, 48. Shell insert structure is formed of a puncture resistant material and may particularly be an integral one-piece construction of corrugated material. The corrugated plastic can be 4 mil corrugated plastic such as manufactured by CORPLAST Packaging Industries.

Sidewall structure 50 is adapted to be removably disposed between shell body panels 46, 48 and is formed of end panel 52, first sidewall panel 54, second sidewall panel 56, shelf panel 58, and shelf flap 72. Sidewall structure is shown here to be an integral one-piece construction of corrugated material and each panel that forms a part thereof is hingegly joined to the other so that the configuration thereof can be manipulated as desired. For example, shelf panel 58 is hingedly joined to first sidewall panel 54. As shown in FIG. 5, then, shelf panel 58 is movable between a first orientation in which it extends generally parallel to end panel 52 and a second orientation, shown here in phantom, wherein shelf panel 58 is oriented at an angle relative to end panel 52.

With reference to FIG. 6, when sidewall structure is inserted between the body panels 46, 48 of the shell insert 42, end panel 52 confronts bottom wall 42, first and second sidewall panels 54 and 56 extend therebetween, and shelf panel 58 extends parallel to and in spaced relation to bottom wall 42. Together shell insert 42 and sidewall structure 50 form a shell interior 51 that is protected and that is sized and adapted to receive fillable insert 60. The assembled structure has four corners, such as corners 81 and 83 protect the interior, providing crush protection for the bladder or parcel received therein.

Figure 2:
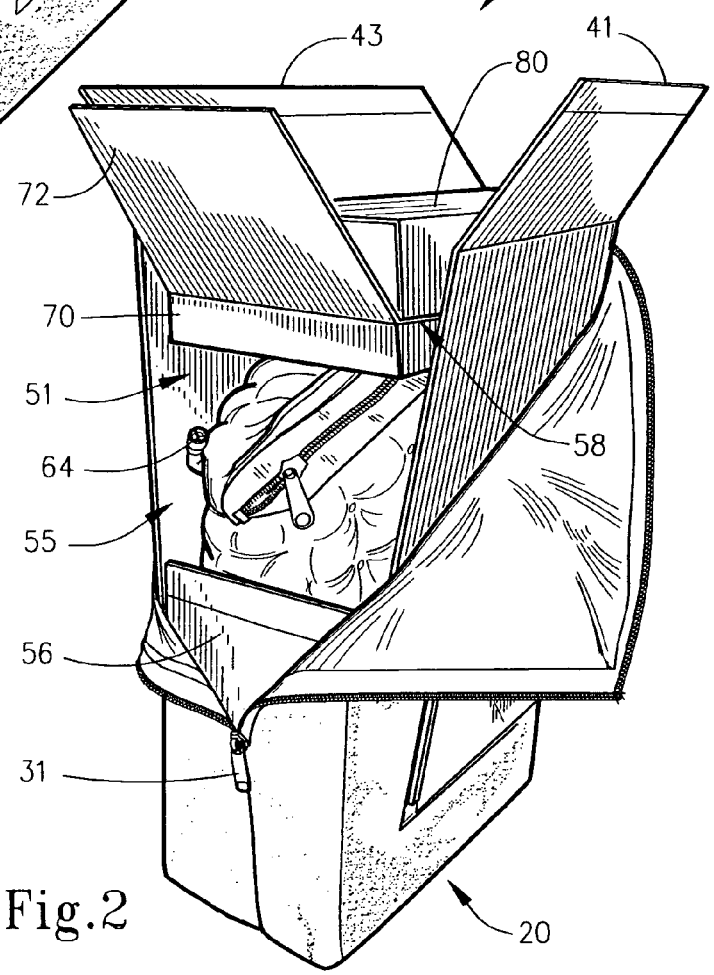
FIG. 2; is a perspective view of the shipping container shown in FIG. 1 which is now open to expose various components associated therewith.

As perhaps best seen in FIGS. 2, 5, and 6, first sidewall panel 54 has a first length that is generally equivalent to the length of each shell body panel 46, 48. On the other hand, second sidewall panel 56 has a length that is less than that of the first sidewall panel, thereby creating a gap 55 between it and shelf panel 58. Shelf flap 72, which is hingedy joined to shelf panel 58 may be selectively positioned to block gap 55, preventing access to the shell interior 51. The usefulness of gap 55 will become more readily apparent in the discussion below. Additionally, sidewall structure 50 can be provided with a resilient protective lining shown here in the form of foam pieces 70 joined thereto by conventional means such as adhesives.

Figure 3:
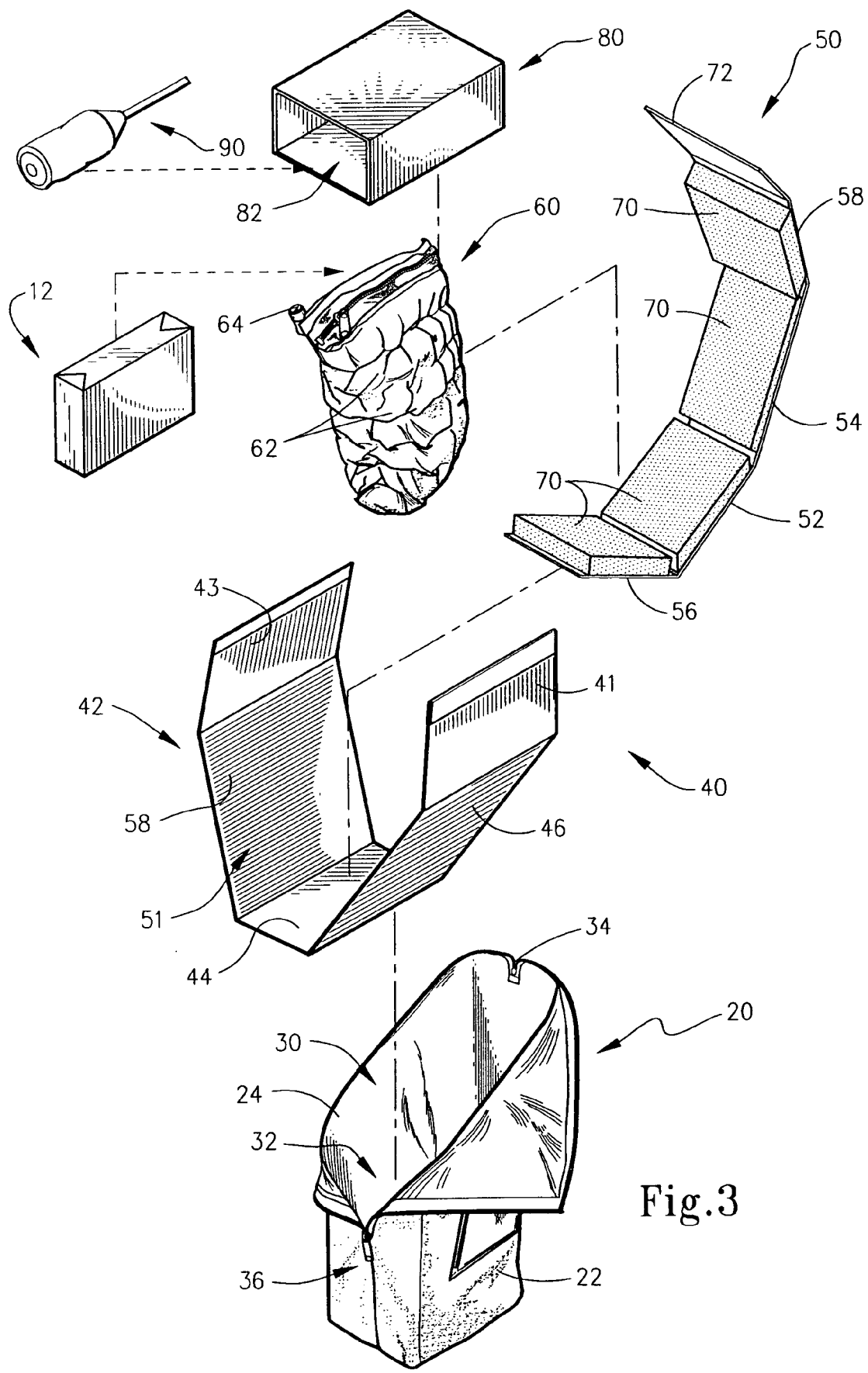
FIG. 3 is an exploded perspective view of the shipping container shown in FIG. 1.

With reference to FIGS. 2, 3, and 7, fillable insert structure is shown here in the form of inflatable bladder 60. Bladder 60 is generally a rectangular flexible member having a matrix of cells 62 which communicate with one another to receive air via inflation valve 64. Other appropriate fillable insert structures are contemplated, that are adapted to receive a selected quantity of a filling medium, such as air, to provide a cushioned environment to protect parcels having a higher degree of fragility, or for parcels which the consumer wants to provide additional protection.

Inflation of bladder 60 may be accomplished by injecting air through the bladder's inflation valve 64, such as through the use of a squeeze bulb 90. As perhaps best shown in FIG. 7, parcel 12 is insertable through the open mouth 66 and disposed in bladder interior 69. After disposed therein, mouth 66 can be closed using closure 68 shown here in the form of a zipper and, subsequently, bladder 60 can be inflated to an appropriate level so that it conforms to the shape of the parcel 12.

Accessory compartment 80, as shown, is rectangular in configuration, having an interior 82, that is sized and adapted to receive selected items to accompany the parcel for shipment. Particularly, accessory compartment is sized and adapted to receive squeeze bulb 90, the convenience of which will be readily apparent from the discussion below. Accessory compartment may be open ended, or include at least one end wall to assist in retaining the items placed therein.

Now that the components of shipping container 10 have been described, the assembly thereof can be more readily understood. As may be appreciated, protective insert assembly 40 can be disposed and assembled in outer casing interior 32 thereby to form shell interior 51 for receiving bladder 60. Bladder 60 may then be disposed in the shell interior 51, either with or without parcel 12. Since shelf panel 58 is movable, greater ease of disposing bladder 60 into shell interior 51 may be accomplished by first moving shelf panel 58 at an appropriate angle relative to the end panel 52 thereby allowing greater access to shell interior 51.

Once, bladder 60 is disposed in shell interior 51 with parcel 12, in turn, disposed in the bladder interior, the appropriate filling medium can then be communicated thereto to provide a cushioned environment for the parcel as described above. Since bladder 60 is already disposed in the shell interior, communication of a suitable filling medium, such as air, can be conveniently accomplished, by locating, for example, inflation valve 64 so that it is accessible via gap 55, which is best shown in FIG. 2, permitting it to easily accessible by squeeze bulb 90 and allowing inflation to take place.

After inflation of bladder 60 and after shelf panel 58 is in the first orientation so such that it is parallel to the end wall 52, gap 55 can be blocked by orienting shelf flap so that it depends downwardly of shelf panel 58 (as shown in FIG. 7). If desired, accessory compartment 80 can be disposed on shelf panel 58. Closure flaps 41 and 43 can then be oriented to close over accessory compartment 80 such that it is located between shelf panel 58 and closure flaps 41, 43 in a close fitted relationship.

Subsequently, zippers 34 and 36 can be moved to their respective first and second closed positions to form a packed shipping container 10 ready for shipment as shown in FIG. 1. In the event, however, that it is discovered that bladder 60 requires additional filling medium, it can be quickly and conveniently accessed by moving just zipper 34 into its open position. Squeeze bulb 90 could be removed from accessory compartment, shelf flap could then be swung open to again expose inflation valve 64.

If desired, a locking structure could be provided shown here in the form of a cable tie 99, to retain both zippers 34 and 36 in their respective closed positions. Cable tie 99 is looped through the pull tabs 31, 33 of each zipper 34, 36 to keep them in the closed position. Other appropriate locking structures are also contemplated that would retain closures in the closed position so as to safely retain the parcel in the shipping container.

With the above components and assembly thereof in mind, it should be appreciated that alternative constructions and materials can be used to accomplish the benefits derived by shipping container 10. For example, outer casing 20 could have one closure to accommodate all of mouth 30, rather than two. Also, with respect to the protective insert structure, the sidewall structure could be modified so that the side panels are each of equal length. Access to the inflation valve could be obtained by forming an opening through the sidewall in which the inflation valve could be mounted.

Having discussed the exemplary embodiment and contemplated modifications thereto, it should be readily appreciated that a method of packaging a parcel to be shipped is also contemplated. According to this method, an outer casing is provided that has a casing interior. A protective shell is disposed in the casing interior, which has an opening associated therewith. A fillable insert structure is inserted into the interior of the protective shell in which a parcel to be shipped is located. A selected quantity of a filling medium is then delivered to the fillable insert via the opening associated with the protective shell, after which the casing is closed about the protective shell.

The methodology may also incorporate the step of disposing the protective shell in the casing interior so that the opening is accessible prior to closing the casing thereabout. The methodology may further include the step of blocking the opening after delivering the selected quantify of filling medium.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

What is claimed is:

1. A container adapted to receive a parcel for shipment to an intended recipient, comprising:
   (A) a flexible outer casing having a casing interior and a casing mouth communicating therewith;
   (B) a first casing closure movable between
      (1) a first open position such that the parcel may be inserted into and removed from the casing interior; and
      (2) a first closed position to retain the parcel in the casing interior as a received parcel;
   (C) a shell insert adapted to be removably disposed in the casing interior, said shell insert having a shell interior, including
      (1) first and second shell body panels; and
      (2) first and second shell sidewall panels extending between said first and second shell body panels, said second shell sidewall panel configured so as to form an opening in communication with the shell interior; and
   (D) a fillable insert adapted to be removably disposed in the shell interior and having an insert interior for receiving the parcel and an insert mouth communicating therewith, said fillable insert structure being adapted to receive a selected quantity of a filling medium to provide a cushioned environment for the parcel when disposed therein, said filling medium being communicated thereto through the opening when said fillable insert structure is disposed in the shell interior.

2. A container according to claim 1 including a second casing closure movable between the first open and first closed positions.

3. A container according to claim 1 wherein said outer casing is generally rectangular in configuration and includes a front casing panel joined to a back casing panel, each said first and second casing panel having a bottom edge, a top edge, and a pair of sides edges, said first casing closure being located proximately to the top edges.

4. A container according to claim 3 including a second casing closure located proximately to one of the side edges and movable between
   (A) a second open position so that when said shell insert is disposed in the casing interior, the second shell sidewall opening is accessible to permit the communication of said filling medium to said fillable insert structure; and
   (B) a second closed position wherein the opening is not accessible.

5. A container according to claim 4 wherein each said first and second casing closure is a zipper having a pull tab.

6. A container according to claim 4 including a locking member adapted to retain both said first and second casing closures in the first and second closed positions, respectively.

7. A container according to claim 1 wherein said shell insert includes a shelf panel joined to said first shell sidewall and sized and adapted to span the shell interior.

8. A container according to claim 7 wherein said first and second shell sidewalls, and said shelf panel are an integral one-piece construction of corrugated material.

9. A container according to claim 7 including an accessory compartment supported by said shelf panel and adapted to receive selected items to accompany the parcel for shipment.

10. A container according to claim 9 wherein said shell insert includes a closure flap hingedly joined to said first shell body and adapted to extend in parallel in spaced relation to said shelf panel, said accessory compartment being located between said shelf panel and said closure flap in a close-fitted relationship.

11. A container according to claim 1 wherein said fillable insert is an inflatable bladder.

12. A container according to claim 11 wherein said inflatable bladder includes an inflation valve and wherein said inflation valve is accessible via the opening.

13. A container according to claim 1 including a resilient protective lining adapted to line the shell interior.

14. A container according to claim 13 wherein said resilient protective lining is foam and wherein said foam lines said first and second shell sidewall panels.

15. A container adapted to receive a parcel for shipment to an intended recipient, comprising:
 (A) a flexible outer casing having a casing interior and a mouth;
 (B) a first casing closure movable between
  (1) an open position such that the parcel may be inserted into and removed from the casing interior, and
  (2) a closed position to retain the parcel in the casing interior as a received parcel;
 (C) a protective insert assembly adapted to be removably disposed in the casing interior, including
  (1) a shell insert, including
   (a) a bottom shell wall; and
   (b) first and second shell panels supported by said bottom shell wall and extending upwardly therefrom in spaced relation to one another; and
  (2) a sidewall structure adapted to be removably disposed between said first and second shell panels thereby to define a protected interior, including
   (a) an end panel adapted to confront said bottom shell wall;
   (b) a first sidewall panel supported by said end panel and adapted to extend between said first and second shell panels;
   (c) a second sidewall panel supported by said end panel in spaced relation to said first sidewall panel and adapted to extend between said first and second shell panels; and
   (d) a shelf panel supported by said first sidewall panel in spaced relation to said end panel; and
 (E) a fillable insert structure removably disposed in the protected interior and having an insert interior for receiving the parcel and an insert mouth communicating therewith, said fillable insert structure being adapted to receive a selected quantity of a filling medium to provide a cushioned environment for the parcel when disposed therein.

16. A container according to claim 15 wherein said first sidewall panel has a first length and said second sidewall panel has a second length that is less than the first length such that a gap is formed between said second sidewall panel and said shelf panel.

17. A container according to claim 16 wherein the gap is in communication with the protected interior and wherein said filling medium may be communicated to said fillable insert structure when disposed therein.

18. A container according to claim 17 wherein said shelf panel includes a shelf flap joined thereto that is selectively positionable to block the gap so as to prevent access to the protected interior.

19. A container according to claim 16 wherein said outer casing includes a second closure and movable between
 (A) a second open position wherein the gap is accessible; and
 (B) a second closed position wherein access to the gap is prevented.

20. A container according to claim 19 wherein each said first and second casing closure is a zipper having a pull tab.

21. A container according to claim 19 including a locking member adapted to retain both said first and second casing closures in the first and second closed positions, respectively.

22. A container according to claim 15 including an accessory compartment supported by said shelf panel and adapted to receive selected items to accompany the parcel for shipment.

23. A container according to claim 22 wherein said shell insert includes a closure flap hingedly joined to said first shell panel and adapted to extend in parallel in spaced relation to said shelf panel, said accessory compartment being located between said shelf panel and said closure flap in a close-fitted relationship.

24. A container according to claim 15 wherein said shelf panel is hingedly joined to said first sidewall panel and movable between
 (A) a first orientation wherein said shelf panel extends generally parallel to said end panel; and
 (B) a second orientation wherein said shelf panel is oriented at an angle relative to said end panel.

25. A container according to claim 15 wherein said sidewall structure is an integral one-piece construction of corrugated material.

26. A container according to claim 15 where said sidewall structure is lined with a resilient protective lining.

27. A container according to claim 26 where said lining is foam.

28. A method of packing a parcel for shipment to an intended recipient, comprising:
 (A) providing an outer flexible casing having a casing interior;
 (B) disposing a protective shell into the casing interior, said protective shell having a shell interior and an opening associated therewith;
 (C) inserting a fillable insert structure having an insert interior into the shell interior;
 (D) delivering a selected quantity of a filling medium to said fillable insert via the opening so as to provide a cushioned environment for the parcel located therein; and
 (E) closing said casing about said protective shell.

29. A method according to claim 28 including the step of disposing said protective shell in the casing interior so that the opening is accessible prior to closing said casing.

30. A method according to claim 28 including the step of blocking the opening after delivering said selected quantity of filling medium.

* * * * *